March 22, 1949.  T. B. GIBBS ET AL  2,464,975
FLUID OPERATED CLUTCH
Filed Aug. 19, 1944
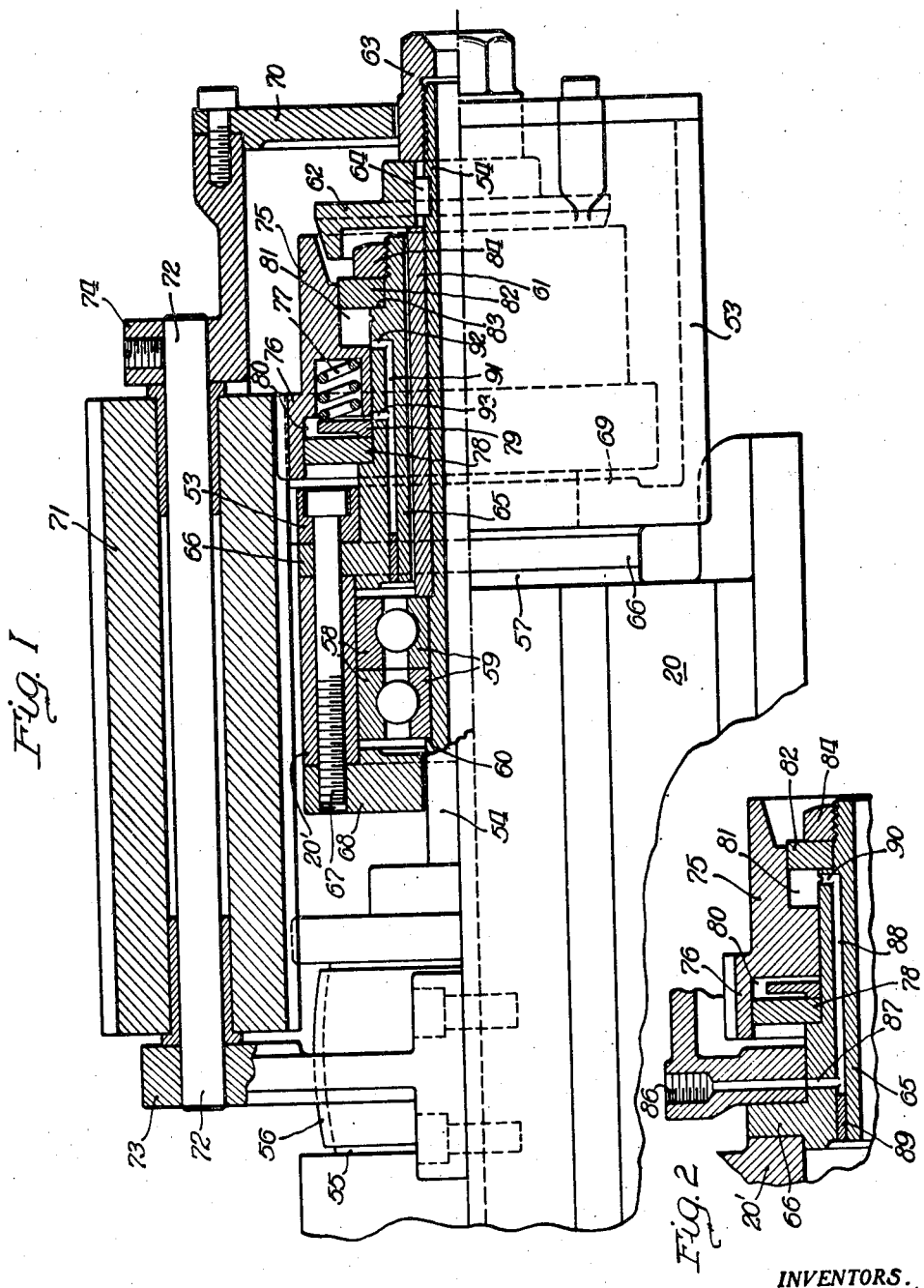
INVENTORS.
Thomas B. Gibbs
Robert E. Brandt
BY R.J. Richardson
Atty.

Patented Mar. 22, 1949

2,464,975

UNITED STATES PATENT OFFICE 2,464,975

FLUID OPERATED CLUTCH

Thomas B. Gibbs and Robert E. Brandt, Delavan, Wis., assignors to The George W. Borg Corporation, Chicago, Ill., a corporation of Delaware Application August 19, 1944, Serial No. 550,270

8 Claims. (Cl. 192—85)

1

The present invention relates in general to fluid operated clutches, and more in particular to clutches of this character which are adapted for use in coupling a rotating element such as a shaft to its driving element. As specifically disclosed herein, the invention is an air controlled clutch for coupling the spindle of a combined automatic lathe and hobbing machine to the hob motor.

This application is for subject matter disclosed in application Serial Number 468,060, filed December 7, 1942, now Patent Number 2,415,206, issued February 4, 1947, in which the combined automatic lathe and hobbing machine referred to is disclosed and claimed.

The invention will be described more in detail hereinafter with reference to the accompanying drawing, in which—

Fig. 1 is a view showing the clutch and the associated parts of the machine to which it is applied, the clutch being shown partly in section; and Fig. 2 is a partial section taken on a different plane and showing the passage for admitting compressed air to the clutch.

The machine to which the invention is applied is adapted for the manufacture of small pinions from rod stock and includes a hollow spindle and collet for holding and rotating the rod stock, a set of radially disposed tools for turning the pinion shaft, and a hob located just beyond the tools in the direction of the head stock motion for cutting the pinion teeth. In the operation of the machine, the end of the stock is first turned down in known manner to form the shaft at one end of the pinion which is being made. When this operation is completed, the head stock is moved quickly forward to bring the stock into the vicinity of the hob, and the hobbing operation is performed while the incompleted pinion is still part of the stock. As soon as the hobbing operation is finished, the head stock is returned the proper distance to bring that portion of the stock from which the other end of the pinion shaft is to be formed into operative relation to the tools, and the shaft is finished by further turning operations. The completed pinion is then cut off from the stock, whereupon the collet is opened and the head stock is moved back to get a fresh grip on the stock preparatory to making another pinion.

A motor is provided for driving the spindle and a separate motor is provided for driving the hob. During turning operations the spindle is driven by the spindle motor, to which it is always connected. During hobbing operations the power is shut off from the spindle motor, which is allowed to run free, and the spindle is driven by the hobbing motor through the medium of suitable gears and the clutch which forms the subject matter of the present invention. The clutch is used to uncouple the spindle from the hob motor during turning operations, when the spindle is driven by the spindle motor, and to couple the spindle to the hob motor during hobbing operations, when it is necessary to drive the spindle at a speed which bears a definite relation to the hob speed.

Referring now to the drawing, the head stock is partially shown in Fig. 1, where it is indicated by the reference character 20. The hollow spindle is indicated at 54 and is supported on the head stock by means of ball bearings in known manner. The spindle is provided with a pulley 55 and is driven from the spindle motor by means including the belt 56.

The drive from the hob motor includes a gear which is in mesh with the wide faced pinion 71, the latter being long enough so that the gear and pinion stay in mesh in any head stock position. The pinion 71 drives a gear in the clutch, as will be explained shortly. The clutch is concentric with the spindle and is contained within the clutch housing 53.

One of the several sets of ball bearings which support the spindle is located just to the left of the clutch housing and is shown in Fig. 1. The head stock 20 has a rounded upwardly projecting extension 20' which at its right hand end is a continuation of the boss 57 at the end of the head stock. This boss has a machined circular end surface concentric with which the end of the head stock including extension 20' is bored out to receive the outer ball races 58. The inner ball races 59 are clamped against the shoulder 60 on the spindle 54 by means of the tubular sleeve 61, the clutch member 62 and the nut 63. The clutch member 62 is prevented from turning on the spindle by means of a key 64.

The reference character 65 indicates the clutch bearing member, which is generally of cylindrical shape and has a flange 66 which engages the machined end surface of the boss 57. The clutch bearing member and the clutch housing 53 are secured to the head stock against the boss 57 by means of screws such as 67. The screw 67 passes through the head stock extension 20' and is threaded into the cover member 68. The other screws are threaded into the head stock.

The clutch housing 53 is generally cup-shaped and has an annular interior ridge 69 at the bottom through which the holes are drilled for the screws such as 67. The other end of the clutch housing is closed by the circular plate 70. The bottom of the clutch housing has a semi-circular cutout and the upper wall is also cut away to admit a part of the long pinion 71. This pinion is provided with bearing bushings at the ends, as shown, and is rotatable on the shaft 72 which is supported on the bracket 73 attached to the head stock and an upwardly projecting extension 74 of the clutch housing.

As mentioned hereinbefore, one of the clutch members is indicated at 62 and is rigidly secured to the spindle. The other clutch member is indicated at 75 and is formed integrally with the gear 76 which is in mesh with the long pinion 71. When the clutch is disengaged, the position in which it is shown in the drawing, the clutch member 75 is rotatable on the clutch bearing member 65.

The clutch member 75 is urged to the right by three coil springs such as 77 which are located in recesses in the clutch member. These springs are compressed between the clutch member and the bronze bearing ring 79, which rotatably engages the air seal ring 78. It will be noted that there is an annular air chamber 80 inside the gear 76 between the air seal ring 78 and the end of clutch member 75.

The clutch member 75 is urged to the left by air pressure in the annular air chamber 81, which is closed by an air seal ring 82, clamped against the shoulder 83 on the clutch bearing member 65 by means of the nut 84. Compressed air is supplied to the chamber 81 by means of an input pipe (not shown) having a coupling which is threaded into an opening 86 at the bottom of the clutch housing. The opening 86 is shown in Fig. 2, which is a section taken on a plane which is angularly displaced from the sectional plane of Fig. 1. From the bottom of opening 86 a hole 87 is drilled through the bottom of the clutch housing and the clutch bearing member 65 to intersect the longitudinal hole 88 drilled in the clutch bearing member. The hole or channel 88 is closed at one end by a plug 89 and at the other end communicates with the air chamber 81 by way of a hole 90 drilled in the clutch bearing member.

The clutch bearing member 65 also has a longitudinal hole or channel 91, Fig. 1, which is similar to the channel 88, Fig. 2. The channel 91 is connected with the air chamber 81 by a hole 92, and is connected with the air chamber 80 by a hole 93.

The valve through which compressed air is supplied to the input pipe above referred to is so arranged that in its open position the pipe is connected to the compressed air supply source while in its closed position the pipe is opened to the atmosphere. When the air chamber 81 is at atmospheric pressure the springs 77 move the clutch member 75 to the right and hold it in engagement with the clutch member 62. In this condition the clutch is engaged and rotation of the pinion or gear 76 rotates the spindle 54. It should be observed also that the movement of the clutch member 75 to the right closes the air hole 92. When compressed air is supplied to the air chamber 81 the clutch member 75 is moved to the left to disengage the clutch. When the clutch member 75 arrives at about the position in which it is shown in Fig. 1, the hole 92 is partly opened and compressed air leaks out of air chamber 81 into air chamber 80. The movement of the clutch member 75 to the left stops when the air pressure in air chamber 80 becomes high enough to compensate for the difference between the force exerted by the springs 77 and the force exerted by the compressed air in air chamber 81.

The valve above referred to may be operated automatically in proper timed relation to the operation of other parts of the complete machine, as will be readily understood. During the initial turning operations the valve is open and supplies compressed air to the annular chamber 81, whereby the clutch is maintained in disengaged position. At this time the spindle is driven by the spindle motor by means of belt 56. When the hobbing operation is about to start the valve is closed, shutting off the compressed air and venting the input pipe. This reduces the pressure in chamber 81 to atmospheric pressure and allows the clutch to engage, with the result that the spindle is driven from the hob motor, the drive including the pinion 71 and gear 76. Upon the completion of the hobbing operation, the valve is again opened to admit air to the chamber 81 to disengage the clutch, the spindle motor is started, and the final turning operations required are performed.

It will be understood that although the invention has been described as applied to a certain specific machine, it is well adapted for use in connection with other machines, and in many cases may be used without modification. Changes in construction may be made, however, to adapt the clutch to use in special situations, or for other reasons, and we do not, therefore, wish to be restricted to the exact form and construction disclosed herein, but desire to include and have protected by Letters Patent all forms and modifications of the invention which come within the scope of the appended claims.

We claim:

1. In a machine tool for making parts from rod stock, a tubular spindle for rotating the stock, two clutch members coaxially disposed with reference to said spindle, a first one of said members being fixed to the spindle, a bearing for supporting the second clutch member independent of the spindle, means for rotating said second mentioned clutch member on said bearing, resilient means for sliding the second clutch member on said bearing to engage said clutch members, and an annular air chamber including a part of said clutch member to which compressed air is admitted to disengage said clutch members.

2. In a machine tool for making parts from rod stock, a tubular spindle for rotating the stock, two clutch members coaxially disposed with reference to said spindle, a first one of said members being fixed to the spindle, a bearing for supporting the second clutch member independent of the spindle, means for rotating said second mentioned clutch member on said bearing, resilient means for sliding the second clutch member on said bearing to engage said clutch members, an annular air chamber including a part of said second clutch member to which compressed air is admitted to disengage said clutch members, a second air chamber including an oppositely disposed part of said second clutch member, and an air passage connecting said air chambers which is closed when the second clutch member is in engaged position and is opened by movement of said second clutch member to disengaged position.

3. In a clutch for driving a rotatable shaft or spindle, two clutch members coaxially disposed with reference to said spindle, a first one of said members being fixed to said spindle, means independent of said spindle supporting the second clutch member for both rotary and axial motion, said means comprising a fixed cylindrical bearing member, said axial motion being effective to produce engagement and disengagement of said clutch members, an annular axially expansible and contractible air chamber surrounding said spindle for causing the axial motion of said second clutch member, and means for supplying compressed air to said chamber, said last means including an air passage formed in said bearing member.

4. The combination, with a rotatable shaft or spindle, of a clutch comprising two clutch members coaxially disposed with reference to said spindle, a first one of said members having a connection to said spindle, means supporting the second clutch member for rotary and axial motion relative to said spindle, said axial motion being effective to produce engagement and disengagement of said clutch members, means for causing axial motion of said second clutch member in one direction comprising an annular air chamber concentric with said spindle, a second air chamber concentric with said spindle, and means responsive to movement of said second clutch member when air is admitted to said first air chamber for admitting air to said second air chamber to arrest such movement.

5. The combination, with a rotatable shaft or spindle, of a clutch comprising a first clutch member fixed to said shaft, a second clutch member supported for rotation relative to said shaft and movable axially of the shaft relative to said first clutch member, two air chambers in said clutch having a common wall formed by a part of said second clutch member, and two air passages in the clutch for supplying compressed air to said air chambers, respectively, to control the axial movement of said second clutch member, one of said air passages being connected to its associated air chamber by a port which is opened and closed by movement of said second clutch member.

6. The combination, with a rotatable shaft or spindle, of a clutch comprising a clutch member fixed to said shaft, a fixed cylindrical bearing member surrounding said shaft, a second clutch member rotatably supported on said bearing member and axially movable thereon relative to first clutch member, two annular air chambers surrounding said bearing member for controlling the axial movement of said second clutch member, an air passage formed in said bearing member for supplying compressed air to a first one of said air chambers, and a second air passage formed in said bearing member for supplying compressed air from said first air chamber to said second air chamber.

7. The combination, with a rotatable shaft, of a clutch comprising two clutch members concentric with the shaft, one of said clutch members having a driving connection with the shaft and the other being rotatable relative to the shaft, means for producing a controlled movement of one clutch member axially of the shaft relative to the other clutch member, said means including two annular air chambers surrounding said shaft on opposite sides of the axially movable clutch member, means for supplying compressed air to one of said air chambers, and means responsive to movement of said axially movable clutch member for supplying compressed air to the other of said air chambers.

8. The combination, with a rotatable shaft or spindle, of a clutch comprising two clutch members concentric with the shaft, one of said clutch members having a driving connection with the shaft and the other clutch member being rotatable relative to the shaft, one of said clutch members also being axially movable along the shaft relative to the other clutch member, means including two annular air chambers surrounding said shaft on opposite sides of the axially movable clutch member for controlling the axial movement thereof, each air chamber having a movable wall formed at least in part by a part of said axially movable clutch member, and air passages in said clutch for supplying compressed air to said air chambers.

THOMAS B. GIBBS.
ROBERT E. BRANDT.

REFERENCES CITED

The following references are of record in the file of this patent:

UNITED STATES PATENTS

| Number | Name | Date |
| --- | --- | --- |
| 703,411 | Hartness | July 1, 1902 |
| 1,196,593 | Schellenbach | Aug. 29, 1916 |
| 1,249,736 | Frink | Dec. 11, 1917 |
| 1,254,951 | Ward | Jan. 29, 1918 |
| 1,444,573 | Voigt | Feb. 6, 1923 |
| 1,938,906 | Hoelscher | Dec. 12, 1933 |
| 2,113,362 | Amidon | Apr. 5, 1938 |

FOREIGN PATENTS

| Number | Country | Date |
| --- | --- | --- |
| 137,200 | Great Britain | Jan. 8, 1920 |